United States Patent [19]

Johnson et al.

[11] Patent Number: 4,935,287
[45] Date of Patent: Jun. 19, 1990

[54] STRETCHABLE LAMINATE CONSTRUCTIONS

[75] Inventors: Brian D. Johnson, Woodbury; Malcolm B. Burleigh, St. Paul, both of Minn.

[73] Assignee: Minnesota Mining and Manufacturing Company, St. Paul, Minn.

[21] Appl. No.: 400,516

[22] Filed: Aug. 30, 1989

[51] Int. Cl.$^5$ .................................... B32B 27/14
[52] U.S. Cl. ...................... 428/198; 428/152; 428/246; 428/252; 428/253; 428/224; 428/226
[58] Field of Search ............... 428/152, 198, 253, 246, 428/252, 284, 286

[56] References Cited

U.S. PATENT DOCUMENTS

| | | | |
|---|---|---|---|
| 2,692,873 | 10/1954 | Langerak et al. | 260/77.5 |
| 3,127,306 | 3/1964 | Turton et al. | 428/253 |
| 3,440,133 | 4/1969 | Burnett | 428/253 |
| 3,576,703 | 4/1971 | Baker et al. | 428/253 |
| 3,755,062 | 8/1973 | Schermer | 428/198 |
| 4,104,430 | 8/1978 | Fenton | 428/253 |
| 4,187,390 | 2/1980 | Gore | 174/102 |
| 4,443,511 | 4/1984 | Worden et al. | 428/253 |
| 4,539,255 | 9/1985 | Sato et al. | 428/252 |
| 4,539,256 | 9/1985 | Shipman | 428/315 |
| 4,613,544 | 9/1986 | Burleigh | 428/315 |
| 4,692,369 | 9/1987 | Nomi | 428/198 |
| 4,761,324 | 8/1988 | Rautenberg et al. | 428/198 |
| 4,833,026 | 5/1989 | Kausch | 428/315 |

*Primary Examiner*—James J. Bell
*Attorney, Agent, or Firm*—Donald M. Sell; Walter N. Kirn; David W. Anderson

[57] ABSTRACT

Stretchable laminate constructions based on an elastic fabric and a substantially non-elastic film which are held in intimate contact with one another by means of a discontinuous pattern of adhesive are disclosed. When the laminate constructions of the invention are in a relaxed state, the length of the film between adjacent adhesion points along the direction of stretch of the elastic fabric is substantially equivalent to the length of the elastic fabric between the same adhesion points when the construction is extended to its elastic recovery limit. A preferred embodiment of the invention utilizes waterproof breathable non-elastic membranes to produce laminate constructions suitable for clean room and protective garment applications.

21 Claims, 2 Drawing Sheets

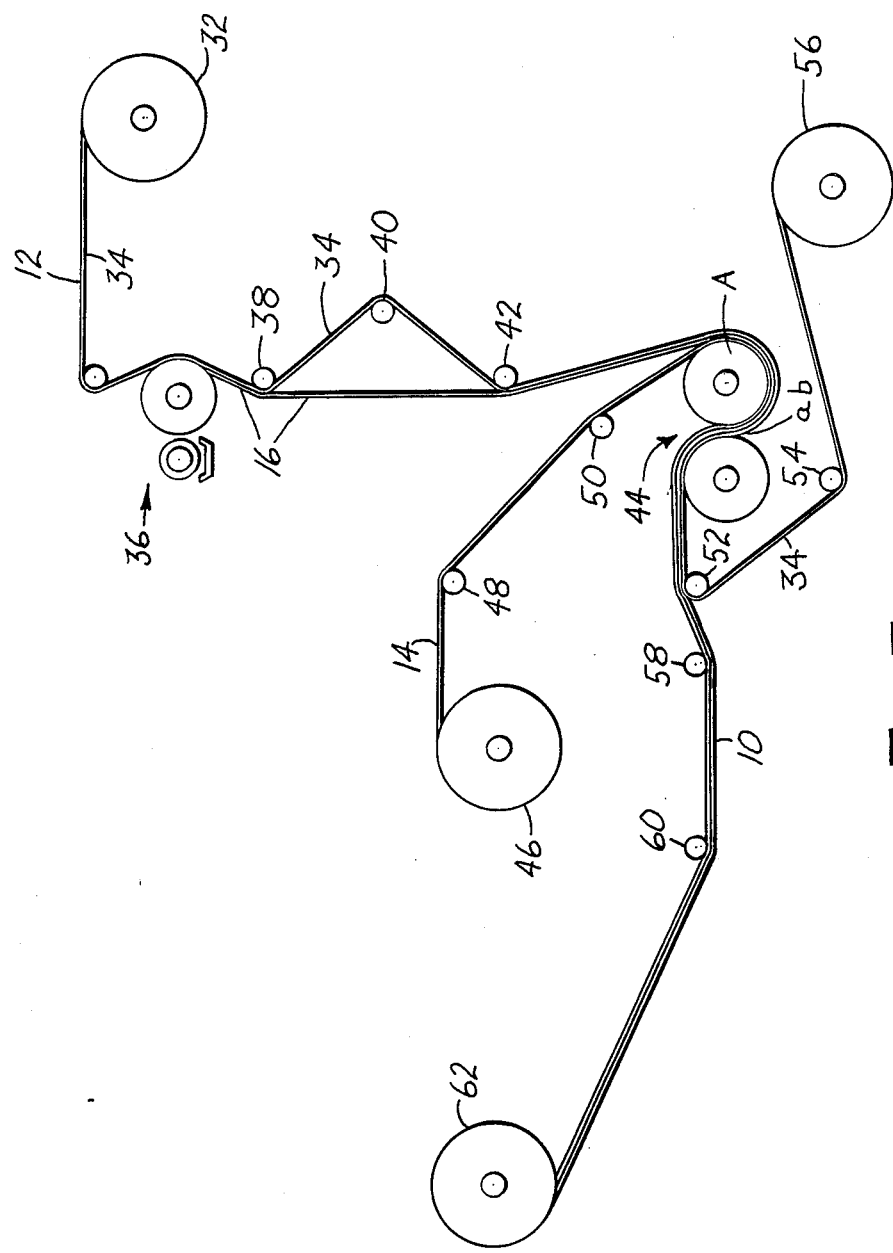

STRETCHABLE LAMINATE CONSTRUCTIONS

FIELD OF THE INVENTION

The present invention relates to stretchable laminate constructions, and in particular, to stretchable, waterproof, breathable laminate constructions.

BACKGROUND OF THE INVENTION

Materials suitable for protective garments for wear in rain, in handling hazardous chemicals or in situations where the environment must be protected from being contaminated by the wearer (i.e. clean rooms) while the wearer must also be protected from hazardous chemicals ideally should keep the wearer dry by preventing leakage of water or fluids into the garment and by allowing perspiration to evaporate from the wearer to the outside of the garment.

A variety of water-proof, breathable materials are known. Fabrics treated with silicones, fluorocarbons and other water repellent treatments usually are breathable, allowing perspiration to evaporate, but they offer marginal waterproofness. They frequently allow water leakage under very low pressures and they typically allow spontaneous leakage after mild abrasion or mechanical flexing. Non-elastic polytetrafluoroethylene (PTFE) based materials have, in large part, replaced treated fabrics for protective garment applications as the PTFE materials have excellent breathability and waterproof properties decidedly superior to the treated materials. Most recently, PTFE based materials having elastomeric properties have been introduced to the market which offer improved wearer comfort relative to the non-elastic PTFE materials.

According to the Encyclopedia of Textiles, third edition, pages 310 to 315, there are two categories of stretch fabrics, the categories being based on the degree of stretchability of the fabric. They are: (1) Power or Action Stretch and (2) Comfort Stretch.

"Power Stretch or Action Stretch," as the names imply, provide a fabric with a high degree of extensibility and quick recovery. The stretch factor generally ranges from at least 30 to 50 percent or more with no more than 5 to 6 percent loss in recovery. Such stretch fabrics are best adapted to ski wear, foundation garments, swim wear, athletic clothing and professional types of active sport wear.

Comfort Stretch applies to fabrics with less than 30 percent stretch factor and no more than 3 to 5 percent loss in recovery. Such fabrics are used in clothing for everyday wear which need only a moderate degree of elasticity.

The clothing industry is using stretch fabrics more extensively for garments where flexibility of movement is essential; for example in athletic garments, running suits, exercise suits, ski wear, etc. More recently, these fabrics have also been utilized for protective garments where the stretch properties of the fabric allow for a closer fitting garment without adversely effecting the wearer's comfort.

U.S. Pat. No. 4,187,390 (Gore) describes a polytetrafluoroethylene polymer in a porous form which has an amorphous content exceeding about 5% and which has a microstructure characterized by nodes interconnected by fibrils. The material has high porosity and high strength. It can be used to produce shaped articles such as tubes, rods and continuous fibers. Laminations can be employed and impregnation and bonding can be readily used to produce a large variety of articles. Compressed articles of very high strength can also be produced from these porous forms. A wearable fabric using such a bonded laminate is sold under the name GORE-TEX TM. These GORE-TEX fabrics are not considered elastic fabrics.

U.S. Pat. No. 4,443,511 (Worden et al.) describes a water-proof and breathable elastomeric polytetrafluoroethylene layered article for use in, for example, material for protective articles. The waterproof and breathable polytetrafluoroethylene layered article can exhibit elastomeric properties of stretch to break of 275% in the longitudinal direction and 145% in the transverse direction and a total stretch recovery of at least 39% after being stretched to 75% extension for 100 cycles. The invention further provides a waterproof and breathable elastomeric polytetrafluoroethylene layered article bonded to a stretch fabric. The waterproof and breathable elastomeric polytetrafluoroethylene layered article bonded to a stretch fabric is thus durable and possesses a moisture vapor transmission rate exceeding 1000 gm/m$^2$/24 hours, and preferably above 2000 gm/m$^2$/24 hours. The materials of this invention exhibit comparatively poor stretch recovery properties.

U.S. Pat. No. 4,539,255 (Sato et al.) describes a moisture-permeable waterproof fabric which comprises a polyamino acid modified polyurethane film having a thickness of 2 to 20 microns and a fabric bonded on the polyurethane film by a polyurethane adhesive in an amount of at least 10 gm/m$^2$. The polyamino acid modification ratio of the polyurethane film is within the range of 2 to 20%. The total amount of the adhesive and the polyurethane film is not more than 50 gm/m$^2$. The fabrics of this invention are not considered elastic fabrics.

U.S. Pat. No. 4,692,369 (Nomi) describes a water-vapor-permeable waterproof, highly elastic film of expanded, porous, unsintered polytetrafluoroethylene having impregnated within the pores of the porous film, on both sides thereof, a water-vapor-permeable resin, for example, an elastomer containing urethane bonds and hydrophilic group(s) in its molecular structure. The film of the invention is useful in clothing, tents, and various applications where water vapor transmission characteristics and waterproofness are simultaneously desired. The film has elongation percentage in at least one direction exceeding 40% and durability in repeated stretching to 80% of its elongation percentage of more than 200,000 cycles. The materials of this invention are films and the elongation and recovery properties of the films are too low for garment applications requiring comfort stretch properties.

U.S. Pat. No. 4,761,324 (Rautenberg et al.) describes a laminated elastic fabric which includes a layer of stretch material having substantial elastic qualities, a polymer film layer being breathable, water-resistant and having elastic qualities, and an adhesive being present in substantially discontinuous segments bonding the film to the elastic fabric. The polymer film component of the fabrics of this invention has elastic properties.

SUMMARY OF THE PRESENT INVENTION

The present invention provides for a stretchable laminate construction comprising an elastic fabric having a discontinuous adhesive pattern on at least one face which is bonded to a substantially non-elastic film, wherein when said laminate construction is in a relaxed configuration, the length of said film between adjacent adhesion points in the direction of stretch of said elastic fabric is substantially equivalent to the length of said elastic fabric between the same adhesion points when said laminate construction is extended to its elastic recovery limit.

BRIEF DESCRIPTION OF THE DRAWINGS

FIG. 3 is a schematic illustration of a preferred process for manufacturing the laminate constructions of the present invention.

DETAILED DESCRIPTION OF THE INVENTION

Figure 1:
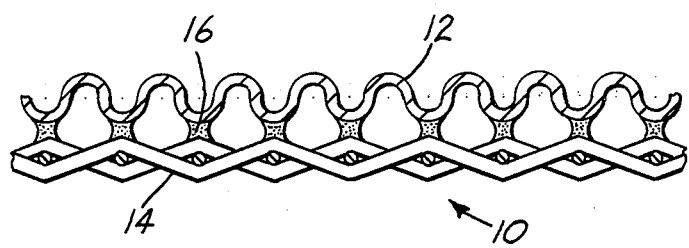
FIG. 1 illustrates, in cross-section, a stretchable laminate construction of the present invention under longitudinal tension.

The present invention provides for stretchable laminate constructions based on an elastic fabric and a substantially non-elastic film which are maintained in intimate contact with each other by means of an discontinuous adhesive interface. The laminate construction is such that when the laminate is in a relaxed configuration, the length of the film between adjacent adhesion points in the direction of stretch of the elastic fabric is substantially equivalent to the length of the elastic fabric between the same adhesion points when the laminate construction is extended to its elastic recovery limit.

A variety of elastic fabrics and substantially non-elastic films can be utilized in preparing the stretchable laminate constructions of the present invention, but the invention is particularly applicable to stretchable, waterproof, breathable laminate constructions having utility in garment applications.

The present invention provides for a stretchable laminate construction, suitable for use in waterproof garments or clean room garments, having a MVTR of at least 400 g/m/m$^2$/24 hours as measured by the upright cup test described in ASTM E-96-80, part B while retaining its resistance to transmission of liquid water. More preferably the stretchable laminate constructions of the present invention have an MVTR of at least 600 gm/m$^2$/24hours and most preferably they have a MVTR of at least 800 gm/m$^2$/24 hours.

The stretchable laminate constructions of the present invention also display improved resistance to abrasion, having an abrasion resistance of at least 50 cycles, more preferably at least 75 cycles and most preferable at least 100 cycles as determined according to ASTM D 3886-80 using 320 grit sandpaper.

In specialty garment applications such as for cuffs or collars in garments, the comfort stretch properties of the laminate construction is particularly important. In these applications the laminate constructions should have a comfort stretch level characterized by a force to stretch the material to 200% of its original length of less than about 0.6 kg/cm width, more preferably less than about 0.5 kg/cm width and most preferably less than about 0.4 kg/cm width.

Another important property of the stretchable laminate constructions of the present invention is their ability to recover to their original dimensions after repeated stretching and twisting. The Gelbo Flex test, as described in ASTM F392-74, was used to stretch the laminate constructions to 180% of their original length and impart a 270 degree twist to the sample in the extended configuration. After 1500 cycles the laminate constructions averaged greater than 95% recovery to their original dimensions.

The stretchable laminate constructions of the present invention show excellent hydrostatic resistance as determined using the Mullins test (ASTM D757-79) with the membrane side of the laminate construction facing away from the water (i.e., in an unsupported configuration). The laminate constructions have an average burst strength of about at least 1 kg/cm$^2$, more preferably of about at least 2 kg/cm$^2$, and most preferably of about at least 3 kg/cm$^2$.

The stretchable laminate constructions of the present invention also provide improved fluid splash or penetration protection (as determined according to ASTM F903-84) from a broad range of chemical solvents and reagents. The increased range of protection encompasses many of the solvents and reagents typically encountered in, for example, clean room environments in the electronics industry such as acetic acid, acetone, isopropanol, methanol, methyl ethyl ketone, phosphoric acid, trichloroethylene, xylene and photoresist materials.

Clean room garment applications are particularly well suited for the stretchable laminate constructions of the present invention as they show excellent particle containment properties as well as low particle shedding characteristics.

FIG. 1 illustrates the cured stretchable laminate construction 10 of the present invention after relaxation. In this configuration the substantially non-elastomeric film 12 assumes a rippled or puckered appearance due to the retraction of the elastic fabric 14 on release of the tension applied to fabric 14. In this relaxed configuration, the length of the film 12 between adjacent adhesion points in the direction of stretch of the elastic fabric 14 is substantially equivalent to the length of the elastic fabric between the same adhesion points when the stretchable laminate 10 is extended to its elastic recovery limit. The discontinuous adhesive pattern 16 maintains the elastic fabric 14 in intimate contact with the substantially non-elastomeric film 12.

Figure 2:
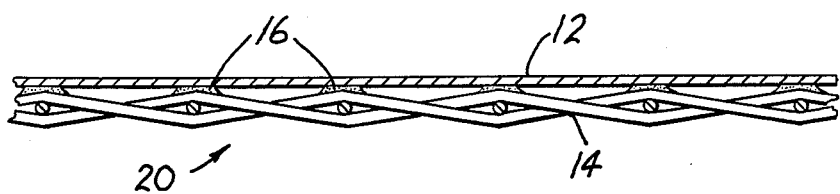
FIG. 2 illustrates, in cross-section, a stretchable laminate construction of the present invention in a relaxed or untensioned state.

In a stretched configuration, either as a cured laminate construction or as an uncured laminate 20 as illustrated in FIG. 2, the elastic fabric 14 is elongated to approximately 175-200% of its original length and the stretchable laminate construction has a substantially flat or planar appearance.

A variety of liquid water impermeable, moisture vapor permeable, substantially non-elastomeric films can be used to prepare the stretchable laminate constructions of the present invention. Suitable films include, but are not limited to hydrophilic polyurethane based films, hydrophobic polyolefinic based films or polyolefinic based films having polyurethane coatings. The moisture vapor permeable materials described in U.S. Pat. No. 4,539,256 (Shipman), U.S. Pat. No. 4,613,544 (Burleigh) and U.S. Pat. No. 4,833,026 (Kausch), which are incorporated herein by reference, are particularly preferred. These porous polyolefin based materials are essentially non-elastomeric in nature, showing minimal elongation before rupture.

Films suitable for the stretchable laminate constructions of the present invention should have a MVTR of at least 600 gm/m$^2$/24 hours as measured by the upright cup test described in ASTM E-96-80, part B. If films having an MVTR lower than about 600 gm/m$^2$/24 in the stretchable laminate constructions of the present invention, the MVTR of the laminate construction may be lower than 400 gm/m$^2$/24 hours as a result of the adhesive covering a portion of the film.

The thickness of the non-elastic film should be selected such that it assures the desired MVTR level for the stretchable laminate construction while retaining an acceptable level of waterproofness. Depending on the specific non-elastomeric film selected, the film thickness can range from about 0.01 mm to 0.04 mm, with film thickness of from about 0.015 to 0.03 mm being preferred.

A wide variety of elastic fabrics can be utilized in the stretchable laminate constructions of the present invention, however for most garment applications it is highly desirable that the cured stretchable laminate constructions not be too stiff so as to offer excessive resistance to body movements.

Conformability of the laminate construction is especially important when the material is used in applications such as cuffs or neck bands for clean room garments as materials which are too stiff become uncomfortable to the wearer in a very short period of time. For these applications the force required to elongate the stretchable composite laminate to 200% of its relaxed length should be less than about 0.6 kg/cm width.

It has been determined that elastic fabrics requiring a force to elongate to 200% of their relaxed length of from about 0.2 kg/cm width to about 0.3 kg/cm width are suitable for preparing stretchable laminate constructions that can be stretched to 200% of their relaxed length by a force of less than about 0.6 kg/cm width.

Elastic fabrics usable in the stretchable laminate constructions of the present invention include woven, non-woven or knitted fabrics. The elastic fabrics are typically composed of a hard or non-elastomeric fiber and an elastic fiber. Suitable hard fibers include synthetic fibers such as nylon, polyester or polypropylene fibers or naturally occurring fibers such as cotton. Suitable elastic fibers include polyurethane block copolymer based fibers as described in U.S. Pat. No. 2,692,873 and sold as Lycra TM fibers.

Knitted fabrics are preferred as the elastic fabrics used in the stretchable laminate constructions of the present invention. More specifically, knitted fabrics having from about 10 to 20% Lycra and from about 80 to 90% hard fibers and a basis weight of from about 90 to 200 gm/m$^2$ have been found to be very useful. Milliken Style 6792 knitted fabric having 87% of a 40 denier polyester fiber and 13% of a 140 denier Lycra fiber, a machine direction/cross machine direction elongation of 208×81% and a basis weight of 130–150 gm/m$^2$ is particularly preferred for the stretchable laminate constructions of the present invention.

A variety of adhesives can be used in the stretchable laminate constructions of the present invention, including, but not limited to, moisture cured adhesive systems, thermally activated adhesive systems or radiation cured adhesives. Regardless of the adhesive system used, it is important that the cure temperature be controlled below a level such that the heat of cure does not adversely effect the stretch properties of the elastic fabric.

A preferred adhesive system is a crosslinkable, urethane adhesive having a tacky consistency with minimal flow at ambient temperatures which can be cured at room temperature. More specifically, a three part crosslinkable, non-crystalline or crystalizable polyether urethane adhesive has been found to be particularly desirable. This system is based on a low molecular weight hydroxy terminated polytetramethylene oxide (PTMO) polymer. The first part of the adhesive system was obtained by reacting PTMO with 4,4'-methylene-bis-(cyclohexylisocyanate) (H$_{12}$MDI) to obtain an isocyanate capped polymer. The second part of the adhesive was prepared by reacting the isocyanate capped PTMO with diethylene glycol (DEG) to obtain a hydroxy capped polymer. The third component of the adhesive comprised a trifunctional urethane crosslinker. The adhesive was coated from a 50–80% solids solution in methyl ethyl ketone (MEK). Solution coating viscosities of from about 1,500 to about 30,000 cps are functional although coating viscosities of from about 4,000 to about 6,000 cps are preferred. The adhesive typically required a cure time of approximately 7–14 days under ambient conditions but the cure time could be significantly reduced, to a period of from about 12 to 24 hours by placing the uncured rolls of laminate construction in an oven maintained at about 50° C.

It is important that the minimum amount of adhesive be used in bonding the components of the stretchable laminate construction together. Adhesive can be applied to either the non-elastomeric film or the elastic fabric in a manner such that it covers less than about 70 percent, more preferably less than about 60 percent and most preferably less than about 50 percent of the surface of the film or fabric. These coverage rates typically correspond to adhesive add-on weights of from about 9 gm/m$^2$ to about 16 gm/m$^2$, with preferred add-on weights ranging from about 11 gm/m$^2$ to about 13 gm/m$^2$. The adhesive coverage can be adjusted over the indicated range to provide a stretchable laminate construction meeting specific performance requirements for a given application. Coating processes such as gravure coating, pattern coating and foam coating are advantageously utilized to apply the adhesive.

The process used to prepare the stretchable laminate constructions of the present invention can be better understood in reference to FIG. 3 which is a schematic illustration of a preferred process.

In the process, the substantially non-elastomeric film 12 on a carrier web 34, was unwound from feed roll 32 and passed through an adhesive coating station 36, where a discontinuous adhesive pattern 16 was applied to one face of the non-elastomeric film. A tension of about 17 gm/cm width was maintained on the film/carrier web sandwich during the coating operation.

On exiting coating station 36, the adhesive coated non-elastomeric film and its carrier web were passed over a tension control roll 38 at which point the carrier web 34 was separated from the film 12. The carrier web passed over idler roll 40 and was brought back into contact with film 12 at spreader roll 42. The separation and relamination of the film and carrier web was incorporated into the process to help reduce bubble formation between the film and the elastic fabric 14 at the downline nip point ab.

Concurrent to the coating operation, elastic fabric 14 was unwound from feed roll 46 and passed over tension control roller 48 and spreader roll 50 to elongate and remove wrinkles in the fabric 14. Control of the of stretch of the elastic fabric 14 at this point of the manufacturing process is very critical as the properties of the laminate constructions will fall outside of the desired range if the fabric is stretched more than about 180% or less than about 130% of its original length. More specifically, if the elongation of the elastic fabric is to low the elongation of the resulting laminate construction will be very low and the force to elongate will be above the target range. Excessive elongation of the elastic fabric produces laminate constructions having elongation forces above the target range and the constructions are also subject to inelastic deformations at high elongations. The preferred elongation range is from about 140% to about 160% elongation of the elastic fabric.

The elastic fabric 14 was pressed into contact with the adhesive coated face of the substantially non-elastomeric material as it contacted roll A of nip roll station 44 and fed as a laminate through nip point ab.

Alternatively, nip roll station 44 can be replaced with a small radius bar to provide the necessary pressure to bring the elastic fabric 14 and the substantially non-elastomeric material 12 into intimate contact with one another.

After leaving nip roll station 44 the uncured stretchable laminate construction 20 and the carrier web 34 passed over a pair of idler rolls 52 and 58. As the laminate construction 20 passed over idler roll 52 the carrier web 34 was separated from the uncured stretchable laminate construction 20 and the carrier web wound on take-up roll 56 after passing over idler roll 54. The uncured stretchable laminate construction 20 was passed over idler roll 58, spreader roll 60 and wound under tension on take-up roll 62. A tension of about 110 gm/cm width was maintained on the uncured laminate construction 20 from nip point ab to take-up roll 62. The tensioned roll 62 of uncured laminate construction 20 was cured by storage at ambient conditions (approximately 20° C.) for a minimum of about seven (7) days but more preferably about fourteen (14) days. Alternatively, the tensioned roll 62 could be cured at elevated temperatures for shorter times. If elevated temperatures are used, the cure temperature should be selected so that it does not adversely effect properties of the elastic fabric. Heating the tensioned roll 62 at about 50° C. for a period of from about 12 to 24 hours has been found to effect the cure of selected thermally activated adhesives without adverse effects on the stretch properties of the elastic fabric.

EXAMPLES

The apparatus described above was used to prepare the stretchable laminate constructions of Examples 1–9. All samples were prepared using the same non-elastic film, namely a 16 gm/m² basis weight film having a thickness of 0.025 mm prepared according to U.S. Pat. No. 4,613,544 (Burleigh).

The elastic fabric for each example is indicated in Table 1.

A three component curable adhesive system was used in all of the examples. Two components were based on a low molecular weight PTMO (MW 1000) which was modified as follows:

Component A

PTMO (1 equivalent) was reacted with $H_{12}MDI$ (2 equivalents) in MEK (75 percent solids solution) at 80° C. using dibutyl tin dilaurate (0.1 percent by weight) as a catalyst to obtain an isocyanate capped prepolymer.

Component B

Prepolymer of Component A (1 equivalent) was reacted with DEG (2 equivalents) in a 60 percent solids solution of MEK at 80° C. to obtain a hydroxy capped prepolymer.

Component C

Desmodur Z 4370, a 70 percent solids solutions of a trifunctional urethane cross-linker in xylene/butyl acetate (available from Mobay Chemical).

The adhesive formulation comprised 9 parts of Component A, 20 parts of Component B and 1 part of Component C in an approximately 65 weight percent solids solution in MEK (viscosity of about 5000 cps).

The non-elastomeric film was carried on a paper carrier web and the film/carrier web sandwich maintained at a tension of about 17 gm/cm width through the coating operation to the nip roll station. The adhesive was coated on the film in a discontinuous manner using a gravure printing roll having a pyramidal pattern with 35 dots per 2.54 cm and a 40% land area and the adhesive add-on level is indicated in Table 1. The elastic fabric, which was maintained under a tension of about 96 gm/cm width from its feed roll to the uncured laminate construction take-up roll, was unrolled from its feed roll such that the "T" face contacted the adhesive on the film. The nip station comprised a rubber roller running against a steel roller and a pressure of about 8.8 kg/cm² was maintained at nip point ab. Film speed through the apparatus was about 9 m/min. Adhesive cure was effected by storing the uncured rolls of laminate constructions at room temperature for 14 days.

TABLE 1

Stretchable Laminate Constructions

| Sample Expl | Elastic Fabric | Adhesive Add-On (gm/m2) | Force to Elongate (kg/cm width) | | | |
|---|---|---|---|---|---|---|
| | | | 125% | 150% | 175% | 200% |
| 1[a] | I | 11.6 | 0.035 | 0.067 | 0.138 | 0.268 |
| 2[a] | I | 13.6 | 0.039 | 0.075 | 0.240 | 0.362 |
| 3[a] | I | 13.6 | 0.047 | 0.142 | 0.346 | 0.464 |
| 4[a] | I | 13.6 | 0.055 | 0.205 | 0.378 | 0.492 |
| 5[b] | I | 13.6 | 0.142 | 0.402 | 0.587 | 0.787 |
| 6[b] | I | 13.6 | 0.091 | 0.358 | 0.575 | 0.787 |
| 7[c] | I | 13.6 | 0.087 | 0.358 | 0.803 | 1.338 |
| 8[c] | I | 13.6 | 0.087 | 0.382 | 0.724 | 1.126 |
| 9[a] | II | 13.6 | 0.063 | 0.212 | 0.374 | 0.500 |
| C1[d] | — | — | 0.052 | 0.142 | 0.240 | 0.327 |

ELASTIC FABRIC DESCRIPTIONS
I. Milliken Style 6792, 87% 40 denier polyester fiber and 13% 140 denier Lycra fiber.
II. Warshow & Sons, 85% 40 denier Antron TM Nylon and 15% 140 denier Lycra Notes
[a] Elastic fabric elongated to approximately 140% its original length during manufacture. Preferred range for elongation forces.
[b] Elastic fabric elongated to approximately 120% its original length during manufacture. Low elongation forces.
[c] Elastic fabric elongated to approximately 190% its original length during manufacture. Excessive elongation forces.
[d] Competitive elastic composite fabric.

The following characterization data for a stretchable laminate construction of the present invention was obtained from the laminate construction produced in Example 2 while the data for the competitive material was generated from the indicated C1 and C2 samples.

TABLE 2

STRETCHABLE LAMINATE CONSTRUCTION CHARACTERIZATION
(Unsupported Configuration)

| Example | MVTR ASTM E-96-80 (gm/m2/day) | Mullins Burst ASTM D751-79 ($\times 10 - 6$ dynes/cm2) | Gelbo Flex ASTM F392-74 (% Recovery) |
|---|---|---|---|
| 2 | 760 | 3.05 | >95 |
| C1 | 1100 | 1.24 | — |
| C2 | 1100 | 0.00 | — |

The data in Table 2 demonstrate that the laminate constructions of the present invention have MVTR properties similar to those of competitive stretchable, water-proof, breathable constructions while having superior strength and recovery properties.

ABRASION RESISTANCE COMPARISONS

Membrane materials continue to provide barrier properties as long as they are intact. Thus, membrane integrity, or its resistance to abrasion, can be followed by monitoring air porosity, as measured in Gurley porosity seconds, as a function of the number of abrasion cycles the laminate construction had experienced. The larger number of Gurley porosity seconds, the less porous, or more intact, the membrane. Abrasion of the laminate constructions of the present invention as well as competitive stretchable water-proof, breathable materials was conducted according to the Stoll Abrasion test (ASTM D3886-80) using 400 grit sand paper and a weight of 0.227 kg. Gurley porosity seconds for the samples were determined according to ASTM D726-Part A. Data for these tests is summarized in Table 3.

TABLE 3

MEMBRANE ABRASION RESISTANCE

| Example | Stoll Abrasion Cycles | Gurley Porosity Seconds |
|---|---|---|
| 2 | 0 | >50 |
| C1 | 0 | >50 |
| 2 | 10 | 18 |
| C1 | 10 | 6.3 |
| 2 | 20 | 4.9 |
| C1 | 20 | 3.1 |
| 2 | 30 | 3.0 |
| C1 | 30 | 2.1 |
| 2 | 40 | 2.1 |
| C1 | 40 | 1.8 |
| 2 | 50 | 1.7 |
| C1 | 50 | 1.5 |

The data in Table 3 demonstrates that the laminate constructions of the present invention show a superior resistance to abrasion as compared to a competitive stretch material.

LIQUID PENETRATION RESISTANCE

Liquid penetration resistance of the stretchable laminate constructions of the present invention as well as competitive materials were determined according to ASTM F903-84. The test procedure calls for two parts, the first being a five minute contact with the challenge at atmospheric pressure and the second being a 10 minute contact with the challenge at 70.3 gm/cm². A pass indication signifies that the sample passed both segments of the test while a fail indication signifies the sample failed a challenge under one of the test conditions. Results of the test are reported in Table 4.

TABLE 4

| CHEMICAL RESISTANCE DATA | | |
|---|---|---|
| | Example | |
| Challenge | 2 | C1 |
| Acetic Acid (26%) | Pass | Pass |
| Acetone | Pass | Fail |
| Ammonium Hydroxide (6 N) | Pass | Pass |
| Diethyl Ether | Pass | Fail |
| Ethyl Acetate | Pass | Fail |
| Hydrochloric Acid (12 N) | Pass | Pass |
| Isopropanol | Pass | Pass |
| Methanol | Pass | Fail |
| MEK | Pass | Fail |
| Phosphoric Acid | Pass | Fail |
| Potassium Hydroxide (28%) | Pass | Pass |
| Toluene | Pass | Pass |
| Trichloroethylene | Pass | Fail |
| Xylene | Pass | Fail |
| Nitric Acid (conc) | Fail | Fail |
| Sulfuric Acid (36 Molar) | Fail | Pass |
| Photoresist[a] | Pass | Fail |

[a] American Hoechst Corp., AZ 1350J-SF

The data in Table 4 demonstrates the superior chemical resistance of the stretchable laminate constructions of the present invention relative to a competitive material.

We claim:

1. A stretchable laminate construction, said laminate construction comprising an elastic fabric having a discontinuous adhesive pattern on at least one face which is bonded to a substantially non-elastic film, wherein when said laminate construction is in a relaxed configuration, the length of said film between adjacent adhesion points in the direction of stretch of said elastic fabric is substantially equivalent to the length of said elastic fabric between the same adhesion points when said laminate construction is extended to its elastic recovery limit.

2. The stretchable laminate construction of claim 1 wherein said substantially non-elastic film comprises a waterproof, breathable film.

3. The stretchable laminate construction of claim 2 wherein said waterproof, breathable film has a MVTR of at least 600 gm/m²/24 hours.

4. The stretchable laminate construction of claim 2 wherein said laminate construction has a MVTR of at least 400 gm/m²/24hours.

5. The stretchable laminate construction of claim 2 wherein said laminate construction has a MVTR of at least 600 gm/m²/24 hours.

6. The stretchable laminate construction of claim 2 wherein said laminate construction has a MVTR of at least 800 gm/m²/24 hours.

7. The stretchable laminate construction of claim 2 wherein the force to elongate said construction to 200% of its original length is less than about 0.4 kilogram/cm width.

8. The stretchable laminate construction of claim 2 wherein the force to elongate said construction to 200% of its original length is less than about 0.8 kilograms/cm width.

9. The stretchable laminate construction of claim 2 wherein said construction has an abrasion resistance of at least 50 cycles as determined according to test procedure ASTM D 3886-80 using 320 grit sandpaper.

10. The stretchable laminate construction of claim 2 wherein said waterproof, breathable film comprises a hydrophobic film.

11. The stretchable laminate construction of claim 9 wherein said hydrophobic film comprises a polyolefin.

12. The stretchable laminate construction of claim 10 wherein said polyolefin film ranges in thickness from about 0.010 to about 0.035 mm.

13. The stretchable laminate construction of claim 11 wherein said polyolefin film ranges in thickness from about 0.015 to about 0.025 mm.

14. The stretchable laminate construction of claim 2 wherein said waterproof, breathable film comprises a hydrophilic film.

15. The stretchable laminate construction of claim 13 wherein said hydrophilic film comprises a polyurethane.

16. The stretchable laminate construction of claim 2 wherein said elastic fabric comprises a knitted fabric.

17. The stretchable laminate construction of claim 2 wherein said elastic fabric comprises a woven fabric.

18. The stretchable laminate construction of claim 2 wherein said elastic fabric comprises a nonwoven fabric.

19. The stretchable laminate construction of claim 2 wherein said adhesive covers less than about 70% of one face of said waterproof, breathable film.

20. The stretchable laminate construction of claim 2 wherein said adhesive covers less than about 60% of one face of said waterproof, breathable film.

21. The stretchable laminate construction of claim 2 wherein said adhesive covers less than about 50% of one face of said waterproof, breathable film.

* * * * *